(12) United States Patent
Kneipfer et al.

(10) Patent No.: US 6,980,486 B1
(45) Date of Patent: Dec. 27, 2005

(54) ACQUISITION SYSTEM PARTICULARLY SUITED FOR TRACKING TARGETS HAVING HIGH BEARING RATES

(75) Inventors: Ronald R. Kneipfer, Narragansett, RI (US); Gerard P. Cousseiroux, Westerly, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/086,728

(22) Filed: Mar. 21, 2005

(51) Int. Cl.$^7$ ............................................. G01S 15/00

(52) U.S. Cl. ....................... 367/129; 367/124; 367/118
(58) Field of Search ....................... 367/118, 119, 124, 367/129

(56) References Cited

U.S. PATENT DOCUMENTS

| | | | |
|---|---|---|---|
| 5,216,640 A * | 6/1993 | Donald et al. | 367/124 |
| 5,432,753 A | 7/1995 | Maranda | |
| 5,471,433 A | 11/1995 | Hannell et al. | |
| 5,481,505 A | 1/1996 | Donald et al. | |
| 5,559,755 A * | 9/1996 | Beam | 367/118 |
| 5,877,998 A | 3/1999 | Aidala et al. | |
| 5,949,739 A | 9/1999 | Reese | |
| 6,049,510 A | 4/2000 | Claassen | |
| 6,525,994 B2 * | 2/2003 | Donald et al. | 367/124 |

* cited by examiner

*Primary Examiner*—Ian J. Lobo
(74) *Attorney, Agent, or Firm*—James M. Kasischke; Michael P. Stanley; Jean-Paul A. Nasser

(57) ABSTRACT

An apparatus for a bearing tracker is disclosed that provides improved estimates of target's bearing, bearing rate and signal-to-noise (SNR). The estimates are computed using normalized beam spectral data from short time interval preceding the initialization process.

4 Claims, 4 Drawing Sheets

US 6,980,486 B1

ACQUISITION SYSTEM PARTICULARLY SUITED FOR TRACKING TARGETS HAVING HIGH BEARING RATES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to an acquisition system associated with towed array, spherical array, and hull array trackers, and more specifically, to an acquisition system that provides relatively accurate estimates of initial values of bearing rate and signal-to-noise ratios making the acquisition system particularly suited for tracking targets having high bearing rates.

(2) Description of the Prior Art

Acquisition systems, such as those used for sea and underwater detection employing towed array trackers, spherical array trackers or hully array trackers that track a target commonly employ recursive routines for establishing the initial parameters of the target. Recursive trackers, which include bearing trackers, such as alpha-beta and Kalman, require initial values of all states that will be updated as new data arrives. An alpha-beta recursive tracker is more fully described in the technical article of T. Benedict and G. Bordner, "Synthesis of an Optimal Set of Radar Track-While-Scan Smoothing Equations," Institute of Radio Engineers Transactions on Automatic Control, AC-7, Jul. 1962, pp 27–32. The Kalman recursive tracker is more fully described in the book by A. Gelb, Chapter 4, Applied Optimal Estimation, Mass. Institute of Technology Press, Cambridge, Mass., 1974.

For all recursive trackers, the closer the initial values are to the actual values, the higher the probability that the tracker, in particular the bearing tracker, will successfully acquire (i.e., begin following) the target. States requiring initialization for modern narrowband trackers are bearing, bearing rate, frequency, frequency rate, and signal-to-noise ratio (SNR). Initial values for bearing and frequency are readily available if an operator, such as the tracker operator, clicks on a line that he has observed on a beam's spectragram (gram). The initial bearing can be set equal to the steering angle of the beam whose gram was clicked, and the initial frequency can be set equal to the center frequency of the fast Fourier transform (FFT) bin containing the clicked point on the gram. Initial values for bearing rate, frequency rate, and SNR, however, are not readily available; they, therefore, are usually set to default values. The typical default value used for bearing rate is zero. This default setting of zero frequently results in a failure to acquire targets that have high bearing rates, i.e., rates significantly different from zero. It is desired that an acquisition system be provided that provides initial values for bearing rate and SNR, so as to more readily acquire targets that have high bearing rates.

SUMMARY OF THE INVENTION

Therefore, it is an object of the present invention to provide for means to improve narrowband tracker acquisitions in scenarios that have high bearing rates with the means providing relatively accurate estimates of initial values of bearing, bearing rate, and SNR using beam spectral data for a short time interval preceding the actual initiation operation of the acquisition system, that is, before assigning a bearing tracker to a target.

In accordance with one aspect, a method is provided by the present invention for a bearing tracker that provides estimates for a target's bearing, bearing rate and signal-to-noise ratio (SNR) prior to assigning the bearing tracker to a target. The method comprises the steps of: a) receiving acoustic signals from objects emitting acoustic signals, the signals being received on multiple beams each comprised of a band of frequencies; b) performing a Fast Fourier Transform (FFT) on the received beams; c) examining each beam's FFT data to determine which beam contains a narrowband signal to be tracked; d) providing a normalizing process of the band of frequencies of each beam so as to create approximately unit mean data in all frequency bins that do not contain a narrowband signal and providing a normalized beam spectral data matrix herefrom in a three-dimensional array comprising beam/frequency/time; and e) utilizing the beam spectral data over a small frequency interval containing the narrowband signal to provide the estimates for the target bearing, bearing rate and signal-to-noise ratio.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts and in which:

DESCRIPTION OF THE PREFERRED EMBODIMENTS

As discussed in the "Background" section, tracking systems have difficulties in acquiring targets having high bearing rates due to the inability to provide realistic estimates of the true values for bearing rate, frequency rate and SNR. The present invention provides means particularly suited to improve narrowband tracker acquisitions in scenarios that have these high bearing rates. More particularly, the present invention provides means that estimate, in a relatively accurate manner, initial values of bearing, bearing rate, and SNR using beam spectral data for a short time proceeding the initialization action. The principles of the present invention that provide for an accurate bearing rate estimate, may be best described by first generally discussing a bearing rate scenario.

Suppose a line passes through point $(x_o, y_o)$ in the xy-plane and makes an angle $\theta$ measured clockwise with respect to the y-axis. Further, suppose that $\theta$ is restricted to lie within the set $\{\theta_j\}_1^J$. If x is bearing, y is time, and the line is a target track, then the target's bearing rate is tan (θ).

Assume that measurements along lines corresponding to each of the $\{\theta_j\}_1^J$ are available in the form:

$$Z_{jk} = A\delta_{jm} + n_{jk}, \, j = 1:J, k = 1:K, \qquad (1)$$

where $\delta_{jm}$ is the Kronecker delta function, and $\theta = \theta_m$. Let j' be the value of j that maximizes mean estimates given by:

$$m_z(j) = \frac{1}{K}\sum_{k=1}^{K} Z_{jk}. \qquad (2)$$

It can be shown, and as will be further described, that $\theta_{j'}$ is a maximum likelihood estimate of θ and is one of the principles of the present invention. The description of the invention may be better understood by first making reference to abbreviations and acronyms given in Table 1.

TABLE 1

| | |
|---|---|
| BTR | Bearing time recorder |
| ENBIT | Enhanced narrowband beam interpolation tracker |
| FFT | Fast Fourier Transform |
| Gram | spectragram |
| Hz | Hertz |
| IBW | Initialization bandwidth |
| ID | Identification |
| IID | independent identically distributed |
| MRA | Maximum response axis |
| PNB | Passive narrowband |
| SNR | Signal-to-noise ratio |
| SPN | Signal-plus-noise |

Figure 1:
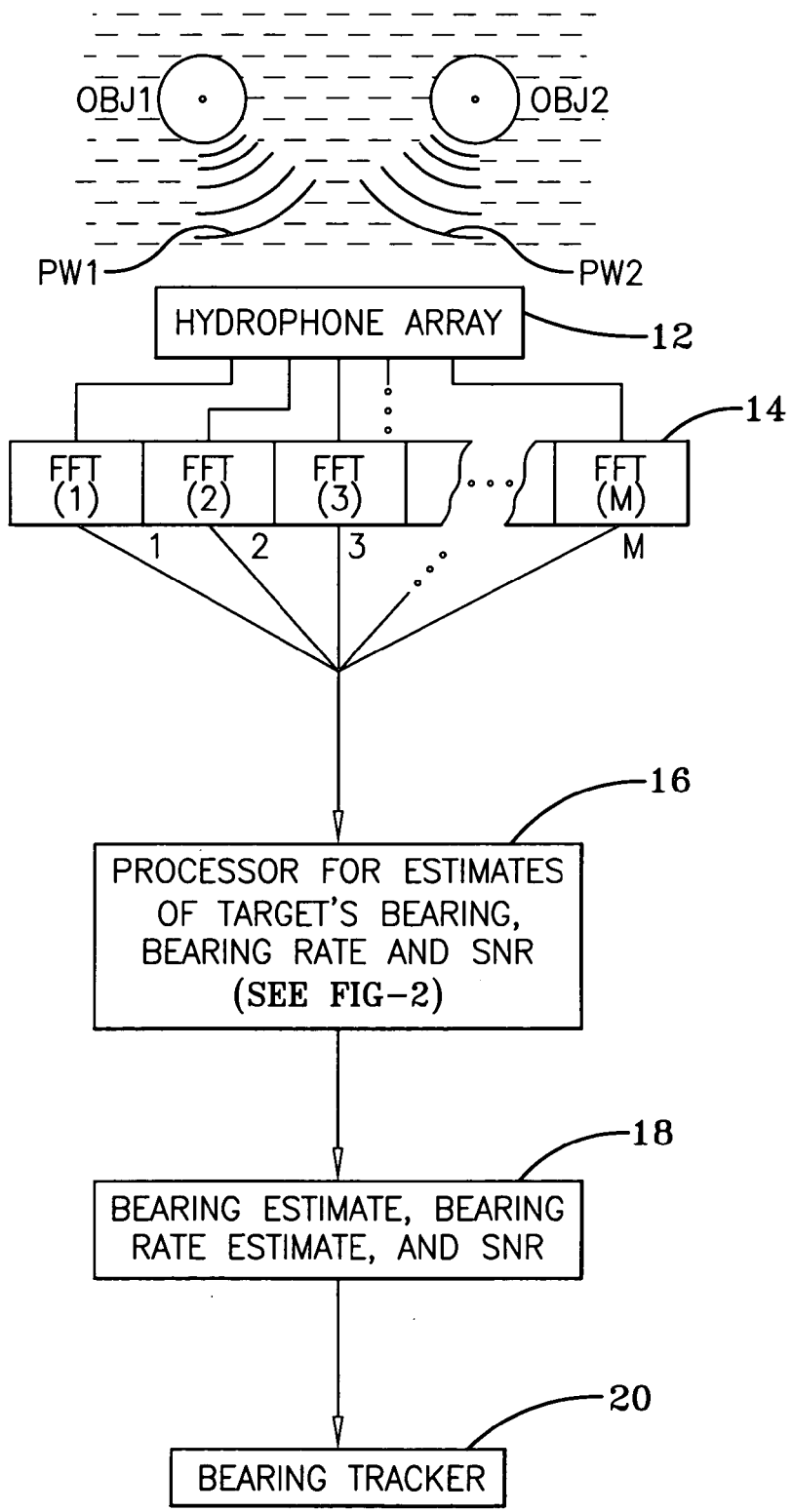
FIG. 1 is a block diagram of apparatus constructed in accordance with the invention.

With reference to FIG. 1, there is an apparatus 10, and a method of operation thereof, that includes a hydrophone array 12 that receives acoustic signals in the water from all potential sources including any underwater objects. The hydrophone array 12 may be a towed array, a spherical array, or a hull array that respectively operates with towed array trackers, spherical array trackers and hull array trackers, all related to the present invention. OBJ1 and OBJ2 represent two objects that produce acoustic signals that radiate as multiple plane waves PW1 and PW2 respectively. Fast Fourier Transform (FFT) processors 14, shown as individual processors FFT(1). . . FFT(M), each process signals from one of M hydrophones in the array 12.

The FFT processor 14 provides outputs to the processor 16, which is of particular importance to the present invention to be further described with reference to FIG. 2, that produces output quantities 18 composed of relatively accurate estimates of bearing, bearing rate, and signal-to-noise (SNR). The relatively accurate estimate are routed to a bearing tracker, herein also referred to as a narrowband tracker, known in the art and one of which is disclosed in U.S. Pat. No. 5,481,505.

In general, the present invention provides an apparatus, and a method of operation thereof, for a bearing tracker that provides estimates for a target's bearing, bearing rate and signal-to-noise ratio (SNR) prior to assigning the bearing tracker to a moving target. The method comprises the steps of: a) receiving, by way of hydrophone array 12 and associated beams, acoustic signals from objects emitting acoustic signals over a band of frequencies; b) performing a Fast Fourier Transform (FFT), by way of the FFT processors 14, on each received beam and assigning FFT bin numbers; c) examining, by way of processor 16, FFT bins of all beams to determine which beam contains a narrowband signal; d) providing, by way of processor 16, a normalizing process over the band of frequencies of each beam, so as to create approximately unit mean data in all frequency bins that do not contain a narrowband signal and providing a normalized beam spectral data matrix herefrom in a three-dimensional array comprising beam/frequency/time; and e) utilizing, by way of processor 16, the beam spectral data over a limited frequency interval surrounding the narrowband signal to provide the estimates 18 for the target bearing, bearing rate and signal-to-noise ratio.

As will be further described, the processor 16 performs the above step e) which comprises: $e_1$) retrieving a subset of data from the three-dimensional array comprising beam/frequency/time, the subset containing the values of beam, frequency and time for all beams and all times, but only over a limited frequency interval surrounding said narrowband signal, the latter frequency interval being known as the initialization bandwidth (IBW); $e_2$) creating a btr matrix; $e_3$) providing an image plot for the btr matrix that includes said target's movements; $e_4$) locating the target on said image; and $e_5$) computing the estimates of the target's bearing, bearing rate and SNR.

Furthermore, as will be further described, the processor 16 performs the locating of the step $e_4$ which includes clicking on the target to provide a clicked beam and wherein the computing of step $e_5$ includes: $e_{51}$) computing approximate beamwidth of the clicked beam; $e_{52}$) computing maximum number of beams within one-half (½) beamwidth of the clicked beam; $e_{53}$) computing indices of beams that are used as fan anchors; $e_{54}$) finding best line in fan from a first anchor beam; $e_{55}$) finding best line in fan from all other anchor beams; $e_{56}$) finding overall best line; $e_{57}$) computing SNR estimate in the IBW of the btr matrix; and $e_{58}$) applying lag correction to best bearing of the best line.

The process of initializing a narrowband tracker begins when an operator clicks on a trace that he has observed on a gram of a given beam. The bearing of the beam whose gram was clicked is designated brg__click; the frequency of the gram FFT bin clicked is designated freq__click; the beam number corresponding to the bearing of the beam is designated jbeam-click; the FFT bin number corresponding to the frequency of the gram FFT bin is designated $bin_{13}$ click; and the total number of beams formed from forward to aft endfire is designated num__beams. The process of the present invention that provides accurate initial quantities may be described with reference to FIG. 2.

Figure 2:
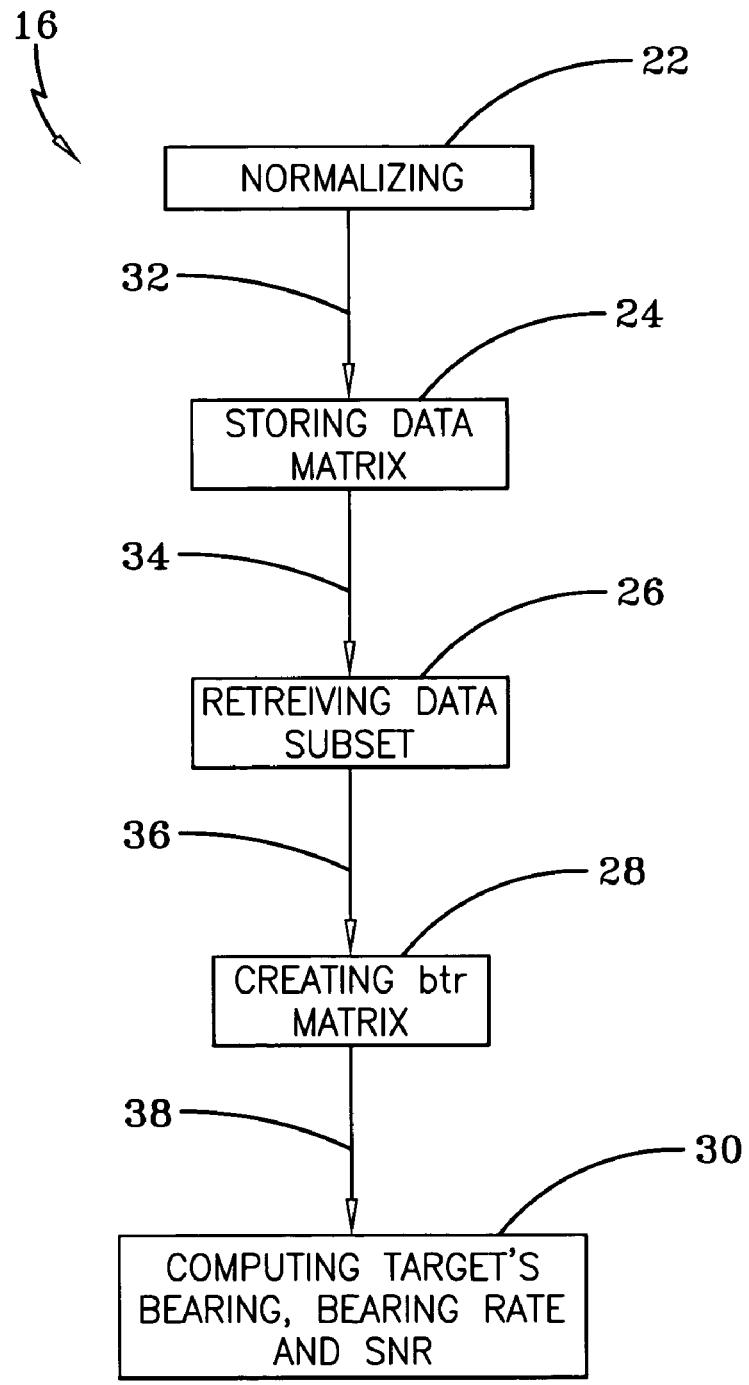
FIG. 2 is a flow chart of the five (5) processing steps of the processor element shown in FIG. 1.

FIG. 2 is a flow diagram of the overall process 16 of the present invention comprised of program segments 22, 24, 26, 28 and 30 having the nomenclature given in Table 2.

TABLE 2

| Program Segment | Nomenclature |
|---|---|
| 22 | Normalizing |
| 24 | Storing Data Matrix |
| 26 | Retrieving Data Subset |
| 28 | Creating btr Matrix |
| 30 | Computing Target's Bearing, Bearing Rate and SNR |

The program segment 22 is the first step in the processing of the present invention and performs a normalization process across a band of frequencies on each beam every time a new update of unnormalized beam spectral data is received. The purpose of the normalization is to create approximately unit mean data in all frequency bins that do not contain a narrowband signal. After completion, program segment 22 passes control to program segment 24 via path 32.

The program segment 24 is the second step in the processing of the present invention and stores the latest normalized, beam/frequency spectral data matrix from step 1 in a three-dimensional array (beam/frequency/time) that extends num_scans updates into the past. After completion, program segment 24 passes control to program segment 26 via path 34.

The program segment 26 is the third step and retrieves a subset of the data from the beam/frequency/time matrix created in program segment 24. The subset consists of the values from all beams and all time, but only over a narrow frequency interval centered about freq_click. This frequency interval is referred to as the "initialization bandwidth" (IBW) and is measured in units of Hertz (Hz). The number of FFT bins in the IBW is designated by nbins_IBW. After completion, program segment 26 passes control to program segment 28 via path 36.

The program segment 28 is the fourth step and creates a matrix named btr having num_scans rows and num_beams columns. Each element in marix btr corresponds to a particular update and a particular beam, and the value of the element is computed as the arithmetic average of the normalized spectral values contained in the IBW bins corresponding to that particular update and that particular beam. The value of each element in matrix btr may be interpreted as an estimate of normalized signal-plus-noise (SPN) in the IBW. An image plot of this matrix is referred to herein as the "IBW bearing time recorder" (BTR). Because the operator had already observed target energy in the IBW before he clicked on a gram to assign a tracker, the IBW BTR should reveal a trace associated with the target's movement across beams over the time interval covered by num_scans updates. If num_scans is not too large, the target's trace on the IBW BTR will be approximately linear and the slope of the trace will be directly related to the target's bearing rate. After completion, program segment 28 passes control to program segment 30 via path 38.

Figure 3:
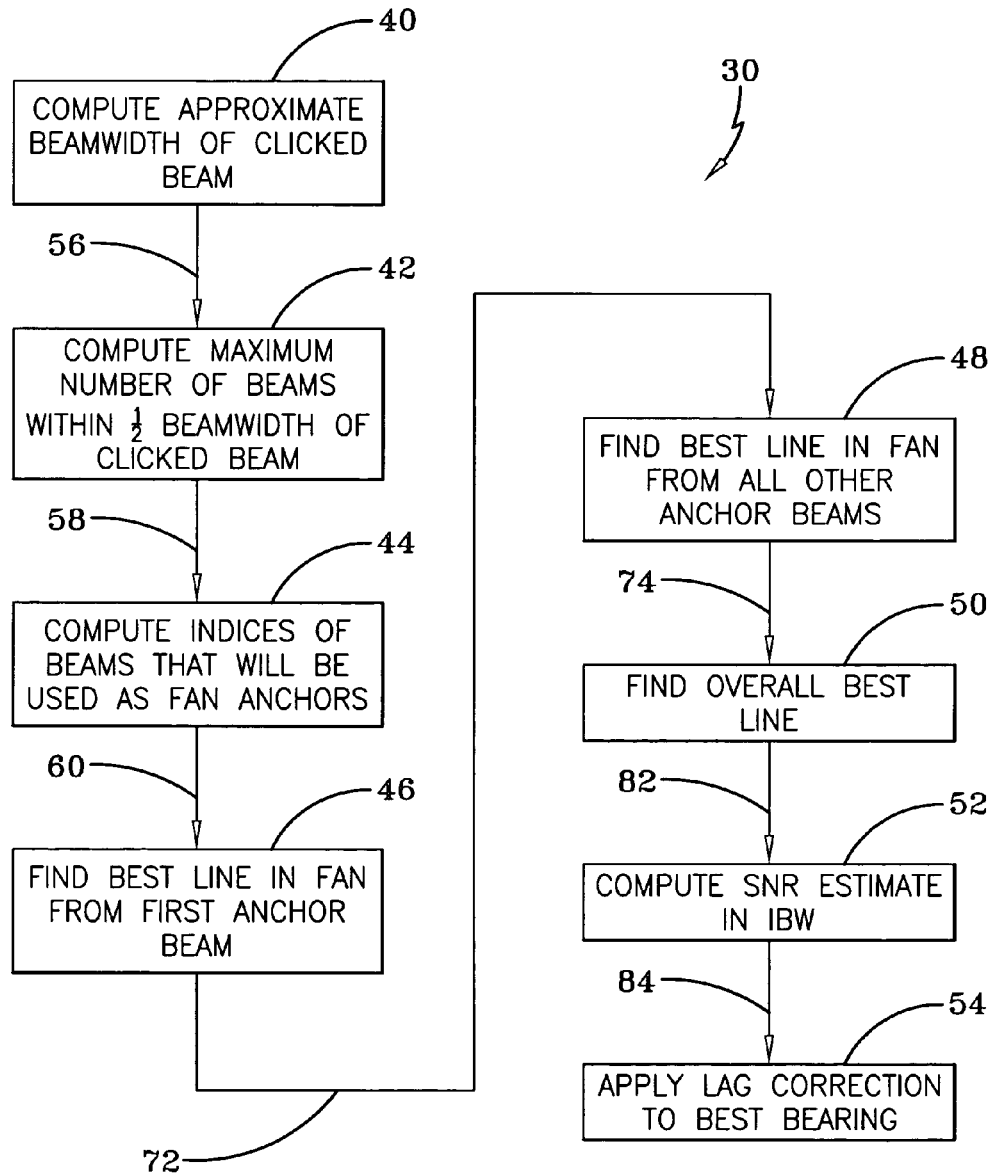
FIG. 3 is a flow chart illustrating the details of the computing target bearing, bearing rate and SNR processing step of FIG. 2.

The program segment 30 is the fifth step and locates the target's trace on the IBW BTR and then computes the target's bearing, bearing rate, and SNR from parameters of the trace. This process entails program segments 40, 42, 44, 46, 48, 50, 52 and 54 having the nomenclature given in Table 3 and shown in FIG. 3.

TABLE 3

| Program Segment | Nomenclature |
| --- | --- |
| 40 | Compute Approximate Beamwidth of Clicked Beam |
| 42 | Compute Maximum Number of Beams Within ½ Beamwidth of Clicked Beam |
| 44 | Compute Indices of Beams that will be Used as Fan Anchors |
| 46 | Find Best Line in Fan from First Anchor Beam |
| 48 | Find Best Line in Fan from all Other Anchor Beams |
| 50 | Find Overall Best Line |
| 52 | Compute SNR Estimate in IBW |
| 54 | Apply Lag Correction to Best Bearing |

With reference to program segment 40 and given the frequency and beamformer steering direction associated with the gram that the operator clicked on to assign the tracker and given the length of the line array's aperture, an approximate beamwidth (beamwidth_approx) for the clicked beam at the clicked frequency can be computed from well-known expressions. The beamwidth_approx function computes an approximate beamwidth using inputs of an MRA angle of the clicked beam, the clicked frequency, the aperture length of the array, which the acquisition system 10 uses, and the speed of sound. After completion, program segment 40 passes control to program segment 42 via path 56.

With regard to the processing performed by program segment 42, beam MRAs are assumed to be equally spaced in cosine of the steering angle. This condition, in conjunction with a value of num_beams, can be used to compute the amount of separation between the MRAs. Knowing the beamwidth and steering direction of the clicked beam allows computation of the amount of cosine space occupied by ½beamwidth. It is then a straightforward operation to compute the number of beams whose steering directions lie within M beamwidth of the clicked beam, which is designated beam_tolerance. If beam_tolerance is less than 2, it is replaced by 2. The processing of parameters involved in these calculations are handled by the function calc_beam_tol. The calc_beam_tol function computes the number of beams that will be used as anchor points for candidate slope estimates on each side of the clicked beam. An approximate beamwidth is calculated using inputs of the steer direction of the clicked beam, the clicked frequency, the array aperture length, and the sound speed. The amount of cosine space occupied by one-half of the beamwidth is computed. The separation in cosine space between beam MRAs is calculated by using an input value for the total number of beams, which allows computation of the number of beam MRAs contained in one-half of a beamwidth. The function outputs this value unless it falls below 2, in which case, it outputs a value of 2. After completion, program segment 42 passes control to program segment 44 via path 58.

With regard to the processing performed by program segment 44, if the operator always clicked on the gram of the beam pointed closest to the target at that time, then possible target traces on the IBW BTR would consist of a set of lines of different slopes, each passing through the beam whose index is ibeam_click at the latest update. This set of lines is referred to as a "fan", and the beam through which the fan's lines pass on the latest update is referred to as the "anchor beam" of the fan. It is assumed in program segment 44 that the slope increment between adjacent lines in the fan is small and that the magnitudes of the slopes of the lines at the two edges of the fan are large. Sometimes, it is difficult for an operator to tell precisely which beam is steered closest to the target when the operator is looking at grams from a number of beams in the target's neighborhood. Thus, it is possible that the target's trace will lie in a fan having an anchor beam that is near, but not equal to, ibeam_click. Program segment 44 assumes that the anchor beam lies within ± ½ beamwidth of ibeam_click. The index of the first beam in this subset is simply (ibeam_click-beam_tolerance), and the index of the last beam is (ibeam_click+beam_tolerance). After completion, program segment 44 passes control to program segment 46 via path 60.

Program segment 46 assumes that there is only one target signal present in the IBW. If the target's trace passes through the first anchor beam of the IBW BTR, then the trace will approximately overlay one of the lines in the associated fan. As previously stated, values contained in matrix btr may be interpreted as estimates of normalized SPN. Because signal is present along the trace only, the average of the SPN values in matrix btr along the line underlying the trace will be higher than along any other line in the fan. Hence, the line within the fan, along which the average btr values is maximum, will be designated as the "best line" for that fan. Also, the average of the btr values along the best line will be saved as an estimate of SPN for that fan. The determination of which elements of btr lie along any given line in the fan is handled by the function rate_est.

The rate_est function computes average powers along a fan of BTR lines emanating from a specified beam at the latest update. Each average is an estimate of SPN power along that line. If a target's trace is present on the BTR, then the line that most closely overlays the trace will have the highest SPN value. Hence, the line with the highest SPN is called the best line in the fan. An estimate of bearing rate is computed from the slope of the best line. This function returns the estimated bearing rate and the associated estimate of SPN. The rate_est function requires inputs given in Table 4.

TABLE 4

| Input Variable | Units | Description |
| --- | --- | --- |
| num_scans | N/A | number of scans of narrowband BTR data history |
| num_beams | N/A | number of beams of narrowband BTR data history |

TABLE 4-continued

| Input Variable | Units | Description |
| --- | --- | --- |
| Btr | N/A | array containing narrow-band BTR data history |
| fan_anchor_beam | N/A | beam that anchors a fan of BTR lines |
| min_slope | beams/update | minimum candidate slope estimate |
| max_slope | beams/update | maximum candidate slope estimate |
| Slope_incr | beams/update | increment of candidate slope estimates |
| band_noise_level | N/A | mean BTR noise power (linear) in system band with IBW |
| Sample_time | Sec | time between BTR scans |

The rate_est includes the routines 62, 64, 66, 68 and 70 given below and which provides outputs (70) given in Table 5.

```
/* ----------------------------------------*/
         Initialize variables (62)
/* ----------------------------------------*/
/* ----------------------------------------*/
slope_bpu = 0;                              /*initial value for estimated slope in units of beams/update (scan) */
min_scan=num_scans;                         /*minimum number of scans used to estimate slopes of lines that hit the
                                            the edge of the BTR*/
dat = 0;                                    /* tmp data */
btr_sum=0;                                  /*tmp btr sum */
a = 0;                                      /* tmp slope */
ibeam = 0, islope = 0, iscan = 0, oldest_scan = 0, oldest_beam = 0, sav_value = 0, cur_value + 0;
/* ----------------------------------------*/
     Search for best line over a fan of lines (64) */
/* ----------------------------------------*/
for (islope = 0, a = min_slope; a <= max_slope; islope++, btr_sum = 0)
  {
  /* ----------------------------------------*/
         Sum btr data along line (66)        */
  /* ----------------------------------------*/
  for (iscan = 0; iscan < num_scans; iscan++)
    {
    fbeam = a * iscan + fan_anchor_beam;    /*Equation of straight line passing through
                                            "fan_anchor_beam" on BTR and having
         slope "a"*/
    Ibeam = (int) (fbeam + 0.5);            /* round */
    If ((ibeam >= num_beams) (ibeam < 0) )  /* Make sure have not gone beyond edges of
                                            the BTR*/
      {
      Break;
      }
    else
      {
      dat = (float) btr [iscan] [ibeam];    /* grab btr value at this point on the line */
      btr_sum = btr_sum + dat               /* sum btr values along the line */
      }
    }
  /* ----------------------------------------*/
  /*     If minimum requirement of used scans is met, average and save value if greater than
         Previously saved value (68)*/
  /* ----------------------------------------*/
  if (iscan >= min_scan)
    cur_value = btr_sum/iscan;
    if (cur_value > sav_value)
      {
      est_slope_bpu = a;
      sav_value = cur_value;
      }
  }
```

-continued

```
    a = a + slope_incr;
  }
/* ---------------------------------------*/
/*            Compute outputs (70)          */
/* ---------------------------------------*/
brg_rate_bpu = est_slope_bpu;    /* bearing rate in beams/update */
signal_plus_noise = sav_value     /* linear signal+noise */
```

TABLE 5

| Output Variable | Units | Description |
|---|---|---|
| brg_rate_bpu | beams/update | estimate of bearing rate |
| signal_plus_noise | N/A | estimate of signal_plus_noise_power (linear) |

After the output of Table 5 are provided, program segment 46 passes control to program segment 48 via path 72.

Program segment 48 determines the best line in the fan for all other anchor beams in a manner as already described for program segment 46. After completion, program segment 48 passes control to program segment 50 via path 74.

At this point, that is, at the entrance to program segment 50, a best line has been identified within the fan associated with each anchor beam, and each best line has an associated SPN estimate. Of all the identified best lines, the one with the maximum SPN is designated as "overall best line." Its slope in units of beams/update is saved in a variable named brg_rate_bpu; its SPN is saved in a variable named signal_plus noise; and the index number of its anchor beam is saved in avariable named best_beam. Equations for computing the slope of the overall best line have already been described with reference to program segment 48.

Figure 4:
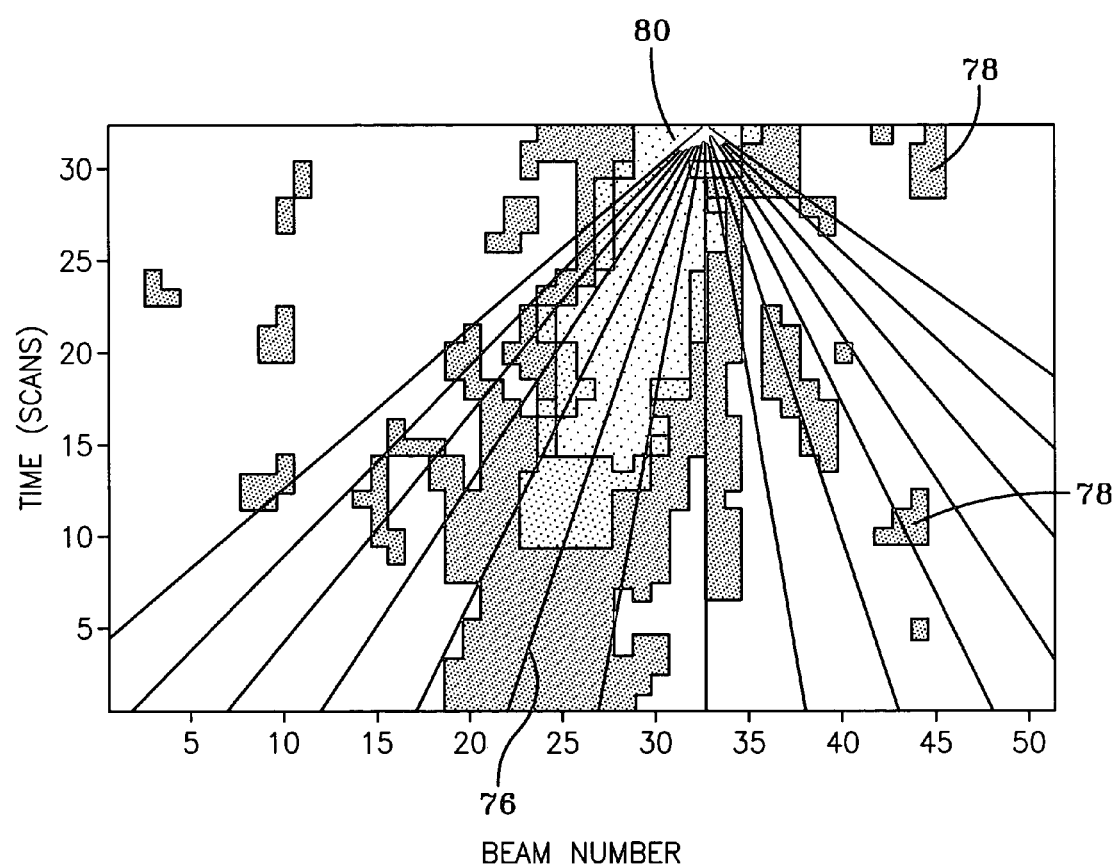
FIG. 4 illustrates an example showing the best line on an initialization bandwidth (IBW) of a bearing time recorder (BTR).

An example of a best line on an IBM BTR is shown in FIG. 4 having an X axis given in beam number and a Y axis given in Time (Scans). FIG. 4 further illustrates best line 76, cross hatched regions identified by use of reference number 78, and clear regions identified by use of reference number 80.

FIG. 2 reveals that the number of updates corresponds to approximately 2 minutes of history. The regions 78 for the image are distributed uniformly over the full range of btr data values. The target's trace is clearly visible, identified by clear regions 80, from roughly update 10 to update 32 and has a positive bearing rate; that is, the target is moving to higher beam numbers as time increases. After completion, program segment 50 passes control to program segment 52 via path 82.

In accordance with the invention program segment 52 provides for the storage of an estimate of the mean of the elements on matrix btr in the absence of a target signal (that is, the IBW noise-only condition). That is to say, the narrowband being tracked is omitted. Program segment 52 calls this variable band noise level. An estimate of the linear SNR in the IBW is computed as:

$$\text{snr\_lin\_ibw} = \frac{(\text{signal\_plus\_noise}) - \text{band\_noise\_level}}{\text{band\_noise\_level}} \quad (3)$$

If the SNR is too low (snr_lin_ibw<=1), program segment 52 assumes that the SNR is too low for reliable initialization estimates. Program segment 52 sets snr_lin_ibw to a default value designated by snr_lin ibw$_{default}$ and then outputs the following default values. In other words, default value is the output the tracker design produces without program segment 52 being added:

brg_rate_rpm=0, where bearing rate is in units of radians/minute;

brg=brg_click, where bearing is in units of radians;

$$\text{snr\_dB\_per\_hz} = 10 * log10 \\ (1.3 * bins\_ibw * df\_bin * snr\_lin\_ibw_{default}) \quad (4)$$

where SNR in a 1-Hz band is in units of dB; and where df_bin is the FFT bin spacing (Hz) and 1.3 is a correction factor for Hamming weights used with the FFT. Upon completion, program segment 52 passes control to program segment 54 via path 84.

With regard to program segment 54, it should first be recalled that the index number of the best line's anchor beam is saved in a variable named best_beam. Program segment 54 provides the fbeam_2_brg function converts a zero-based, floating point beam number to a corresponding bearing. Program segment 54 further provides equations for converting a bearing angle to a beam number, a beam number to a bearing angle, a beam rate to a bearing rate, and a bearing rate to a beam rate. All conversions assume that the beam number is zero based, and that beams are equally spaced in cosine space.

For all equations provided by program segment 54, b is a zero-based, floating point beam number, N is the total number of beams, θ is the bearing angle in radians, and t is a time in any unit such as second, minute, or update.

The conversion of bearing θ to beam b is $$b = \frac{N-1}{2}(1 - \cos(\theta)) \quad (5)$$

The conversion of beam b to bearing θ is $$\theta = \arccos\left(1 - \frac{2b}{N-1}\right) \quad (6)$$

Let $$u = 1 - \frac{2b}{N-1} \quad (7)$$

Substituting (7) into (6) and differentiating with respect to time gives $$\frac{d\theta}{dt} = \frac{d(\arccos(u))}{dt} = \frac{-1}{\sqrt{1-u^2}} \frac{du}{dt} \quad (8)$$

The derivative of (7) with respect to time is $$\frac{du}{dt} = \frac{-2}{N-1} \frac{db}{dt} \quad (9)$$

Substituting (9) and (7) into (8) provides an expression that allows computation of bearing rate $$\frac{d\theta}{dt}$$

given a beam rate $$\frac{db}{dt},$$

i.e., $$\frac{d\theta}{dt} = \frac{1}{\sqrt{1 - \left(1 - \frac{2b}{N-1}\right)^2}} \frac{2}{N-1} \frac{db}{dt} \quad (10)$$

Equation (10) can be rewritten to allow computations of beam rate given a bearing rate, i.e., $$\frac{db}{dt} = \frac{N-1}{2} \sqrt{1 - \left(\frac{1-2b}{N-1}\right)^2} \frac{d\theta}{dt} \quad (11)$$

The manipulation provided by equations (5)–(11) corrects the index number into the beam's associated steering direction. The converted value is denoted by program segment 54 by the variable name best_brg_uncorrected. Depending upon the target's SNR and bearing rate, the target may already have moved to another beam before the operator sees its line on a gram. Computed corrected initialization estimates are provided by the enbit function.

The enbit function is the top function call. The inputs consist of a bearing and a frequency that result from an operator's click on a gram of a beam containing a target the operator wants to track. Other required inputs are the number of updates (scans) of processing 20 data history, the number of FFT bins in the IBW, the sound speed, and the time between data history updates. The data history contains the most recent num_scans of floating point, narrow-window normalized (noise-only mean=1), and passive narrowband (PNB) data. This function retrieves the subset of data from all beams that lie within an IBW centered about the clicked frequency.

The retrieved data are averaged across the IBW on each beam for each scan in the history, and the averaged values are used to create a narrowband BTR over the history time span. A number of beams in the neighborhood of the clicked beam are selected as start points for fans of line averages over the BTR data. The line that most closely matches the target's track (which will be approximately linear for small values of num_scans) will have the largest average value and is the best line; its average value is taken as an estimate of SPN power in the IBW, which is then used to compute an SNR estimate in the IBW.

If the SNR estimate is greater than 0 dB, then (1) the slope of the best line is used to compute an estimate of bearing rate, (2) the endpoint of the best line corresponding to the most recent update is used to compute a preliminary estimate of the target's bearing, and (3) a final bearing estimate is computed by applying a rate-dependent correction factor to the preliminary estimate to compensate for lag delays. If the SNR estimate is less than 0 dB, then enbit returns a default value of 0 radians/min for its bearing rate estimate, a default SNR, and the steering angle of the clicked beam for its default bearing estimate.

It should now be appreciated that the present invention provides improved estimates of a narrowband target's bearing, bearing rate, and SNR for use in initializing narrowband trackers allowing these trackers to acquire targets having high bearing rates. The estimates are computed using normalized beam spectral data from a short time interval preceding the initialization action. The only action required by an operator is to place his beam gram cursor over a line he wishes to track, and then click.

It will be understood that various changes and details, steps and arrangement of parts and method steps, which have been described and illustrated in order to explain the nature of the invention, may be made by those skilled in the art within the principle and scope of the invention as expressed in the appending claims.

What is claimed is:

1. A method for a bearing tracker that provides estimates for a target's bearing, bearing rate and signal-to-noise ratio (SNR) prior to assigning said bearing tracker to said target, said method comprises the steps of:

receiving acoustic signals from objects emitting acoustic signals over a band of frequencies;

performing a Fast Fourier Transform (FFT) on the received beams and assigning FFT bin numbers;

examining FFT bins of all beams to determine which beam contains a narrowband signal;

providing a normalizing process over the band of frequencies of each beam so as to create approximately unit mean data in all frequency bins that do not contain a narrowband signal and providing a normalized beam spectral data matrix therefrom in a three-dimensional array comprising beam/frequency/time; and utilizing the beam spectral data over a limited frequency interval surrounding said narrowband signal to provide said estimates for the target bearing, bearing rate and SNR.

2. The method according to claim 1 wherein said step of utilizing the beam spectral data comprises the substeps of:

retrieving a subset of data from said three-dimensional array comprising beam/frequency/time, said subset containing the values of beam, frequency and time for all beams and all times, but only over said frequency interval surrounding said narrowband signal;

creating a btr matrix;

providing an image plot for said btr matrix that includes said target's movements;

locating said target on said image; and computing the estimates of said target's bearing, bearing rate and SNR.

3. The method according to claim 2 wherein said substep of locating said target on said image includes clicking on said target to provide a clicked beam and wherein said substep of computing the estimates includes the sub-sub-steps of:

computing approximate beamwidth of said clicked beam;

computing maximum number of beams within one-half (½) beamwidth of said clicked beam;

computing indices of beams that are used as fan anchors;

finding best line in fan from a first anchor beam;

finding best line in fan from all other anchor beams;

finding overall best line;

computing SNR estimate in initialization bandwidth (IBW) of said btr matrix; and applying lag correction to best bearing of said best line.

4. An apparatus for a bearing tracker that provides estimates for a target's bearing, bearing rate and signal-to-noise ratio (SNR) prior to assigning said bearing tracker to said target, said apparatus comprising:

a receiver for receiving acoustic signals from objects emitting acoustic signals, including beams, each comprised of a band of frequencies;

an arrangement for performing Fast Fourier Transforms (FFT) on the received beams and assigning FFT bin numbers;

a narrowband signal detector for examining each received beam and its frequency bin to determine which beams contain narrowband signals;

a signal processor for normalizing the band of frequencies of each beam so as to create approximately unit mean data in all frequency bins that do not contain a narrowband signal and providing normalized beam spectral data matrix therefrom in a three-dimensional array comprising beam/frequency/time; and signal utilization apparatus to provide said estimates for the target bearing, bearing rate and SNR, based upon the beam spectral data over a limited frequency interval surrounding said narrowband signal.

\* \* \* \* \*